United States Patent [19]

Streck

[11] 3,718,428
[45] Feb. 27, 1973

[54] ALCOHOLIC COMPOSITION OF A CATIONIC DYE-ALKYL ARYL SULFONIC ACID COMPLEX AND PROCESS OF DYEING THEREWITH

[75] Inventor: Clemens Streck, Loudonville, N.Y.
[73] Assignee: GAF Corporation, New York, N.Y.
[22] Filed: Dec. 21, 1970
[21] Appl. No.: 100,513

[52] U.S. Cl. .................................8/173, 8/177 AB
[51] Int. Cl. ..............................................D06p 5/04
[58] Field of Search..........8/177 AB, 173; 260/240 E

[56] References Cited

UNITED STATES PATENTS

| | | | |
|---|---|---|---|
| 2,922,690 | 1/1960 | Mueller et al. | 8/173 |
| 3,014,776 | 12/1961 | Mecco | 8/177 AB |
| 3,299,055 | 1/1967 | Klingsberg | 8/177 AB |
| 2,663,612 | 12/1953 | Gibson | 8/4 |

FOREIGN PATENTS OR APPLICATIONS 1,028,867  5/1966  Great Britain .................8/177 AB

OTHER PUBLICATIONS

Colour Index, 2nd Ed., Vol. 2, 1956, pp. 2815, 2816

Primary Examiner—George F. Lesmes
Assistant Examiner—T. J. Herbert, Jr.
Attorney—Walter C. Kehm, Samson B. Leavitt and Steven J. Baron

[57] ABSTRACT

A stable dye solution comprising a complex of a basic dye with a linear alkyl aryl sulfonic acid surfactant, a lower alcoholic component, an alkalizing agent to adjust the pH of the solution and water. The instant invention is further directed to a process of preparing said dye solution and a method of using same.

8 Claims, No Drawings

ALCOHOLIC COMPOSITION OF A CATIONIC DYE-ALKYL ARYL SULFONIC ACID COMPLEX AND PROCESS OF DYEING THEREWITH

The instant invention is directed to clear concentrated dye solutions which contain a complex of a basic dye with a linear alkyl aryl sulfonic acid surfactant. In particular, the instant invention is directed to clear dye solutions comprising a complex of a basic dye and a linear alkyl aryl sulfonic acid surfactant in a solvent mixture of a lower alcoholic component, an alkalizing agent to adjust the pH of the solution and water. Furthermore, the instant invention is directed to a process for preparing such dye solutions and method of using same.

The dye solutions of the instant invention are particularly suited for use in connection with acrylic fibers.

"Acrylic" fibers have the common characteristic that such fibers are all hydrophobic. Such hydrophobic polymers are difficult to dye with many of the usual types of commercially available dyestuffs, by pad thermofixation particularly to uniform deep shades. As a result, in the past, many fabrics made therefrom have only been available in pastel shades.

While the cationic dyes have greatly improved the dyeing ability of the "Acrylic" fibers, the industry has still sought to improve the dyeing of such materials by development of faster and more economical processing operations.

In 1949, the Thermosol process of dyeing was developed by duPont for commercial thermofixation of dispersed dyes on polyester fibers. This method led the way in the general direction of producing a faster and more economical processing operation by offering a continuous dyeing system for synthetics which allowed speed of operation parallel to that obtained on natural fibers with conventional processes such as the William's unit or pad-steam processes. This thermofixation process is now well established for the dyeing of certain synthetic fibers and fabrics in the dyeing industry, but its use with cationic dyes for acrylic fibers has so far been unsuccessful. This process basically comprises a continuous method for dyeing fibers, fabrics etc. by a brief exposure of such material to high temperatures. Thus, for example, temperatures of approximately 400°F for approximately 1 minute are conventionally utilized in a Thermosol process to thermofix the dispersed dye in the dyeing of polyester fibers etc.

While such a process also has aided the dyeing of acrylic and other synthetic materials, such process possesses disadvantages which prevented commercial acceptance.

Dispersed dyestuffs can be thermofixed on acrylic fibers, but such dyestuffs cannot be built up to medium and heavy depth, and also, their fastness is generally not sufficient for most uses. While cationic dyestuffs also thermofix on acrylic fibers and in some cases yield good results, there are certain inconveniences present again with the employment of such materials. These include for example, lack of buildup, incompatibility and sensitivity to other classes of dyes and chemicals that may have to be used to assist the operation or to dye other components of a multifiber blend, and, a heavy staining of the equipment that is used in the application of cationic dyestuffs on acrylic fibers. Thus, for example, pad rolls, frame clips, etc. become so heavily stained that cleaning between different runs becomes a major and costly operation in the employment of cationic dyestuffs.

The padding of dispersions of insoluble complexes maintained in dispersion by the addition of a non-ionic surfactant have formed the basis of other proposals. Such a system has the disadvantages of requiring the employment of an additional nonionic surface active agent in order to create a stable dispersion of the insoluble complex formed between the cationic dyestuff and the anionic retarding agent. While such a method produces some satisfactory results, the process is selective as to the dyestuff that can be employed and the system itself is extremely delicate and very difficult to use industrially with success.

It has also been proposed to employ specially dispersed dyes (Sevron T pastes) that form salts in situ with the anions of the fiber during thermofixation. This salt formation does not occur properly, however, unless the fabric has been pretreated (preferably at the boil) with a concentrated solution of ammonium sulfate to replace the fiber polymer anionic groups with an ammonium radical. The ammonium radical, under thermofixation conditions, splits off and allows the fast linkage of the dye to the fiber. In industrial practice, however, this system is not satisfactory. It did not prove economically advantageous because of the necessity of a pretreatment of the fiber before the dyeing operation. It is also a delicate process which involves careful control at an industrial level. Therefore, such a process has not been adopted with success.

As a result of the above development in connection with processes suitable for use in the dyeing of acrylic fibers, processes have been developed in which the basic dyes have been employed extensively. Particularly, such processes are applicable to the newer synthetic fibers such as polyacrylonitrile, mixed fibers containing same, as well as fibers derived from same in addition to other acrylic fibers. As a result thereof, further effort has been extended in the area of producing solutions of such dyes so as to overcome the inconveniences of the user previously associated when the dye employed was applied in a powdered or pulverulent form. When the dye is so supplied to the ultimate user, he must first form a paste, reduce the paste to the desired strength, and subsequently dilute same prior to his use thereof. Furthermore, a dyestuff solution avoids the pollution of the air in and around that area in which the dyeing is being accomplished.

In addition to the difficulties associated with the use of powdered dyestuffs, manufacturers have been confronted with numerous difficulties in the preparation of dye solutions. In the past, it has been extremely difficult to obtain dyestuffs in solutions or liquid form which are concentrated so as to minimize the shipping costs thereof. Furthermore, difficulties have been encountered in the preparation of concentrated dyestuff solutions which are stable under adverse temperature conditions and prolonged storage conditions. In the paste it has been noted that such concentrated dye solutions when subjected to such adverse temperature or prolonged storage conditions result in a haze or precipitate thus, making said solutions unsuitable for use in connection with the dyeing of fibers. Furthermore, such hazing or precipitation results in a change in the concentration of the resulting dye solution and, in addition, the specking of dye on the material which is to be dyed.

As will readily be appreciated from the above, much effort has been expended in the development of concentrated dye solutions, but, to this date, no such solutions which are particularly suited for use in connection with acrylic fibers have been developed. Such a stable dye solution based upon a complex of a basic dye and a linear alkyl aryl sulfonic acid has now been developed in accordance with the present invention.

Therefore, it is an object of the instant invention to provide a clear, stable dye solution.

Another object of the instant invention is to provide a clear, stable dye solution which is particularly suited for use in connection with acrylic fibers.

Yet another object of the instant invention is to provide a concentrated dye solution which comprises a basic dye complexed with a linear alkyl aryl sulfonic acid surfactant.

Yet another object of the instant invention is to provide a concentrated dye solution which comprises a complex of a basic dye with a linear alkyl aryl sulfonic acid surfactant and a solvent mixture comprising a lower alcoholic component, an alkalizing agent to adjust the pH of the solution and water.

A still further object of the instant invention is to provide a process of dyeing acrylic fibers which comprises contacting said fibers with a dye solution comprising a complex of a basic dye and a linear alkyl aryl sulfonic acid surfactant and a solvent mixture comprising a lower alcoholic component, an alkalizing agent to adjust the pH of the solution and water.

A still further object of the instant invention is to provide a process of preparing a stable, concentrated dye solution comprising a complex of a basic dye and a linear alkyl aryl sulfonic acid surfactant and a solvent mixture comprising a lower alcoholic component, an alkalizing agent to adjust the pH of the solution and water.

As previously noted, the instant invention is directed to the preparation of a clear, stable dye solution which comprises a complex of a basic dye and a linear alkyl aryl sulfonic acid surfactant in a solvent mixture of a lower alcoholic solvent, an alkalizing agent to adjust the pH of the solution and water.

It has been found, however, that the basic dye-anionic surfactant complexes while superior to anything previously known are still not sufficiently soluble so as to enable the preparation of suitable dye solutions in sufficient concentrations. It has unexpectedly been found, however, that one can obtain commercially useful dye solutions which liquify readily and produce sufficiently concentrated solutions according to the instant invention. Furthermore, the resulting solutions have been found to be extremely stable and resistant to hazing and precipitation, the primary disadvantages of those solutions previously known.

The dyestuffs employed in the process of the present invention can be prepared from any of the different types of cationic or Basic dyes employed in the dyeing of fibers and fabrics and acrylic fibers and fabrics in particular. The following basic dyes, classified by types are suitable for the preparation of the dyestuffs of this invention:

AATCC Prototype

| Class and Name | C.I. No. | Designation |
| --- | --- | --- |
| Triphenylmethane | | |
| Methyl Violet | 42535 | Basic Violet 1 |
| Magenta ABN | 42520 | Basic Violet 2 |
| Crystal Violet | 42555 | Basic Violet 3 |
| Fuchsine N | 42510 | Basic Violet 14 |
| Genacryl Blue 6G | 42025 | Basic Blue 1 |
| Rhoduline Blue 5BA | 42140 | Basic Blue 5 |
| Genacryl Blue 5B | 42140 | Basic Blue 5 |
| Victoria Pure Blue BGO | 42595 | Basic Blue 7 |
| Victoria Blue BS | 44045 | Basic Blue 26 |
| Brilliant Green B | 42040 | Basic Green 1 |
| Victoria Green S | 42000 | Basic Green 4 |
| Oxazine | | |
| Genacryl Blue 3G | 51005 | Basic Blue 3 |
| Sevron Blue 5G | 51004 | Basic Blue 4 |
| Basic Navy Blue D | 51175 | Basic Blue 6 |
| Nile Blue BXA | 51180 | Basic Blue 12 |
| Anthraquinone | | |
| Sevron Blue B | | Basic Blue 21 |
| Sevron Blue 2G | | Basic Blue 22 |
| Sevron Violet B | | Basic Violet 24 |
| Sevron Blue BGL | | Basic Blue 35 |
| Astrazon Blue C5GL | | Basic Blue 45 |
| Astrazon Blue 3RLW | | Basic Blue 47 |
| Azo | | |
| Bismarck Brown | 21000 | Basic Brown 1 |
| Basic Leather Brown 5R | 21030 | Basic Brown 2 |
| Paper Brown T | 21010 | Basic Brown 4 |
| Cyper Black 1A | | Basic Black 3 |
| Indazol Blue R | 12210 | Basic Blue 16 |
| Acridine Orange N | 46005 | Basic Orange 14 |
| Chrysoidine RS | 11320 | Basic Orange 1 |
| Chrysoidine Y Extra | 11270 | Basic Orange 2 |
| Sevron Yellow 3RL | | Basic Yellow 15 |
| Calcozine Acrylic Yellow G | | Basic Yellow 26 |
| Sandocryl Yellow B–4RL | | Basic Yellow 32 |
| Sevron Orange L | | Basic Orange 24 |
| Sevron Brown YL | | Basic Orange 26 |
| Calcozine Acrylic Orange 3R | | Basic Orange 31 |
| Sevron Red L | | Basic Red 17 |
| Sevron Red GL | | Basic Red 18 |
| Sandocryl Red B–GL | | Basic Red 23 |
| Calcozine Acrylic Red 3G | | Basic Red 30 |
| Calcozine Acrylic Violet 3R | | Basic Violet 18 |
| Thiazole | | |
| Thioflavine | 49005 | Basic Yellow 1 |
| Diphenylmethane (ketonimine) | | |
| Auramine | 41000 | Basic Yellow 2 |
| Basic Yellow AR | 41001 | Basic Yellow 37 |
| Auramine G | 41005 | Basic Yellow 3 |
| Xanthene | | |
| Rhodamine 6G | 45160 | Basic Red 1 |
| Rhodamine G | 45150 | Basic Red 8 |
| Rhodamine B | 45170 | Basic Violet 10 |
| Methine | | |
| Genacryl Orange G | 48035 | Basic Orange 21 |
| Genacryl Orange R | 48040 | Basic Orange 22 |
| Genacryl Pink G | 48015 | Basic Red 13 |
| Genacryl Red 6B | 48020 | Basic Violet 7 |
| Genacryl Yellow 4G | 48055 | Basic Yellow 11 |
| Genacryl Yellow 5G | 48065 | Basic Yellow 12 |
| Astrazon Yellow 7GLL | | Basic Yellow 21 |
| Astrazon Golden Yellow GL | | Basic Yellow 28 |
| Genacryl Pink G | | Basic Red 13 |
| Genacryl Brilliant Red B | | Basic Red 15 |
| Genacryl Red 4B | 48013 | Basic Violet 16 |
| Azine | | |
| Safranine | 50240 | Basic Red 2 |
| Methylene Violet 3RD | 50205 | Basic Violet 5 |
| Thiazine | | |
| Methylene Blue | 52015 | Basic Blue 9 |
| New Methylene Blue A | 52030 | Basic Blue 24 |
| Calcozine Green | 52020 | Basic Green 5 |
| Acridine | | |
| Euchrisine GGNY | 46040 | Basic Yellow 9 |
| Flavo Phosphine R | 46035 | Basic Orange 9 |
| Basic Yellow 3R | 46005 | Basic Orange 14 |

The above list is representative of those cationic dyestuffs that can be advantageously employed in the process of the present invention. It is, of course, to be understood that any suitable cationic dye that is advantageously employed in the dyeing of fibers and fabrics and particularly acrylic fibers and fabrics can be advantageously employed in the production of the water-soluble complex in accordance with the present invention.

In connection with the instant invention, it has been found that one can only obtain the novel complexes by use of a linear alkyl aryl sulfonic acid. This is clearly distinguished from previous efforts in the field wherein anionic surfactants generally have been employed. It is noted, however, that the linear alkyl aryl sulfonic acids provide unique properties to the dye-surfactant complex which cannot be obtained with other anionic surfactants which are derived from carboxylic acid, sulfuric esters, alkane sulfonates, mahogany sulfonates, petroleum sulfonates, phosphorous compounds, other sulfur containing acids, anionic rosin derivatives, lignin derivatives, alkali taurates and sarcosinates, alkali sulfates, and sulfonated derivatives of naphthalene-form-aldehyde condensates. The linear alkyl aryl sulfonic acids that can be employed in accordance with the present invention are generally the $C_8$–$C_{24}$ alkyl aryl sulfonic acid wherein the aryl moiety is selected from the benzene, naphthalene and diphenyl series. Exemplary of the suitable linear alkyl aryl sulfonic acids are:

n-dodecylbenzenesulfonic acid
n-hexadecylbenzene sulfonic acid
n-octadecylbenzenesulfonic acid
n-tridecylbenzenesulfonic acid
n-nonyldiphenylsulfonic acid
n-dodecyldiphenylsulfonic acid
n-nonylnaphthalenesulfonic acid It is preferred that the alkyl chain of these linear alkylaryl sulfonic acids contain from about eight to about 24 carbon atoms.

The novel dyestuff-linear alkyl aryl sulfonic acid complex may be prepared in situ by mixing the dyestuff and the linear alkyl aryl sulfonic acid in a solvent mixture. The temperature of the mixture is usually at room temperature. The reaction is slightly exothermic. The amount of linear alkyl aryl sulfonic acid employed to produce the novel complexes of the instant invention with a basic dye varies with the particular alkyl aryl sulfonic acid employed and the particular dyestuff employed in the production of said complex. When the complex is produced in situ, approximately one part of dyestuff is employed with a slight stoichiometric excess of alkyl aryl sulfonic acid. One may also employ up to ten parts or more of the alkyl aryl sulfonic acid. It should be understood, however, that one may employ a far greater excess of alkyl aryl sulfonic acid and that the limitation on the use of such an excess over that amount which is necessary is purely an economic limitation. The amount of alkyl aryl sulfonic acid necessary to form the complex is that amount which is sufficient for the production of a soluble complex when the alkyl aryl sulfonic acid is complexed with a basic dyestuff.

As previously noted, the novel compositions of the instant invention comprise a complex of a linear alkyl aryl sulfonic acid surfactant and a basic dye in a solvent mixture of a lower alcohol, an alkalizing agent to adjust the pH of the solution and water. The alcoholic solvent employed in connection with the composition is the same solvent employed in the production of the basic dye-linear alkyl aryl sulfonic acid complex. The alcoholic component is preferably a lower alkanol such as, for example, methanol, ethanol, propanol, etc., lower alkylene glycol, such as, ethylene glycol, diethylene glycol, etc., or lower alkoxy ethanol, such as, methoxy ethanol, ethoxy ethanol, and butoxy ethanol, etc. The amount of such alcoholic component employed may be from about 5 to about 25 parts of the total weight of the formulation.

In accordance with the present invention it is preferred at the linear alkyl aryl sulfonic acid be in the free acid form since it is preferable that the pH of the surfactant be within the range of about 3 – 7 when the complex with the basic dyestuff is formed. While the sodium and similar alkali metal and alkaline earth salts are applicable in accordance with the present invention, since such salts are generally at a higher pH of about 7 – 10, it is preferred that such salts be converted to the free acid form prior to preparation of the complex.

While the pH of the complex thus formed is generally within the range of about 1 to 6, the final pH of the solution is within the range of 2 – 7.5, preferably 6 – 7.5. To accomplish this, the solution is alkalized by the addition of an alkalizing agent in an amount sufficient to adjust the pH of the final solution to the desired range.

As the alkalizing agent, any can be used which is capable of adjusting the pH to the desired range. Suitable alkalizing agents include such materials as lower alkyl amines and lower alkanol amines; ammonium hydroxide; alkali metal hydroxides, e.g. sodium hydroxide, potassium hydroxide, lithium hydroxide; alkali metal carbonates and bicarbonates, e.g. sodium carbonate, sodium bicarbonate, potassium carbonate, potassium bicarbonate, lithium carbonate, lithium bicarbonate; magnesium oxide, etc. Of the above, the lower alkyl amines and hydroxides are preferred.

The lower alkyl amines and alkanol amines employed in connection with the instant invention should be in the liquid form and may be exemplified by propylamine, isopropylamine, diisopropylamine, triisopropylamine, isobutylamine, monoethanolamine, diethanolamine, triethanolamine, methylaminoethanol, dimethylaminoethanol, butanolamine, pentanolamines, hexanolamines, heptanolamines and the like. These liquid lower alkyl amines may be employed in amounts of from 3 to about 15 parts of the total weight of the formulation.

The third component of the solvent mixture is water which should be added to produce a clear and stable solution. It is noted, however, that a minimum amount of water should be employed and the minimum is determined by the amount which will produce much a clear and stable solution. It is also noted that other additives including, for example, anti-foam agents and other conventional ingredients may be employed in connection with the instant composition.

The instant invention will now be illustrated by the following more detailed examples thereof. It is to be noted, however, that said invention is not deemed as being limitative thereby.

All parts and proportions referred to herein and in the appended claims are by weight unless otherwise indicated.

EXAMPLE 1

130 parts (Nacconol 98 SA) linear dodecylbenzene sulfonic acid, (free form), 50 parts mixed together. 50 parts of Genacryl Blue 5B (C.I. 42140) and 3 parts DC Antifoam FG (silicon antifoam) were stirred therein. The pH of the mixture was adjusted to from between 6 and 7 with monoethanolamine and water was added to adjust the total volume to 350 parts.

The resulting solution was clear when diluted with water and stable under prolonged storage conditions. Furthermore, it is noted that the resulting solutions did not haze nor form a precipitate.

EXAMPLES 2 – 7

The following formulations were prepared:

|  | 2 | 3 | 4 | 5 | 6 | 7 |
|---|---|---|---|---|---|---|
| Nacconol 98 SA (linear dodecylbenzenesulfonic acid) | 130 | 130 | 130 | 130 | 130 | 130 |
| Cellosolve | 50 | 80 | 60 | 65 | 50 | 50 |
| Water | 68 |  | 63 | 90 | 40 | 40 |
| Monoethanolamine | 27.25 | 28 | 28 | 27.5 | 28 | 27 |
| DC Antifoam FG | 3 | 3 | 3 | 3 | 3 | 3 |
| Genacryl Pink 3G (C.I. Basic Red 14) | 23 |  |  |  |  |  |
| Genacryl Yellow 4G (C.I. Basic Yellow 11; C.I. 48055) |  | 28 | 28 |  |  |  |
| Genacryl Red GL (C.I. Basic Red 18 ) |  |  |  | 38 |  |  |
| Genacryl Red 3BL (C.I. Basic Red 22) |  |  |  |  | 100 |  |
| Genacryl Blue 5B (C.I. Basic Blue 5; C.I. 42140 ) |  |  |  |  |  | 40 |
| Monoethanolamine to pH | 6.5 | 6.5 | 6.5 | 6.5 | 6.5 | 6.5 |
| Water to | 350 | 350 | 350 | 350 | 350 | 350 |

As in Example 1, clear stable liquid resulted from the above formulations.

EXAMPLES 8 – 11

The following examples were formulated in the manner of Example 1.

|  | 8 | 9 | 10 | 11 |
|---|---|---|---|---|
| Nacconol 98 SA (linear dodecylbenzenesulfonic acid) | 130 | 130 | 130 | 130 |
| Cellosolve | 90 | 65 | 65 | 50 |
| Water | 150 | 58 | 60 | 60 |
| Monoethanolamine | 27 | 27 | 27 | 27 |
| Victoria Green S (C.I. Basic Green 4;C.I. 4200) | 100 |  |  |  |
| Genacryl Blue 3G (C.I. Basic Blue 3; C.I.51005) |  | 35 |  |  |
| Genacryl Red 6B (C.I. Basic Violet 7; C.I. 48020) |  |  | 35 |  |
| Genacryl Orange G (C.I. Basic Orange 21; C.I. 48035) |  |  |  | 19 |
| DC Antifoam FG | 3 | 3 | 3 | 3 |
| Monoethanolamine to pH | 6.5 | 6.5 | 6.5 | 6.5 |
| Water to | 450 | 300 | 300 | 300 |

As in Example 1 a clear, stable liquid resulted.

EXAMPLES 12 – 13

As in Example 1 the following formulations were compounded.

|  | 12 | 13 |
|---|---|---|
| Nacconal 98 SA (linear dodecylbenzenesulfonic acid) | 46 | 46 |
| Methanol | 16 | 18 |
| Ammonium hydroxide | 11 | 11 |
| Water | 16 | 17 |
| Genacryl Pink 3G (C.I. Basic Red 14) |  | 7 |
| Genacryl Yellow 4G (C.I. Basic Yellow 11; C.I. 48055) | 10 |  |
| DC Antifoam FG | 1 | 1 |
| pH adjusted with ammonium hydroxide to pH | 7 | 7 |

As in Example 1 clear, stable solutions were produced.

EXAMPLES 14 – 18

The following examples were formulated in the manner of Example 1.

|  | 14 | 15 | 16 | 17 | 18 |
|---|---|---|---|---|---|
| Conoco C-550, (free acid of linear dodecylbenzene sodium sulfonate) | 130 |  |  |  |  |
| Dowfax 2A 1, (free acid of sodium dodecyl-diphenyletherdisulfonate) |  | 130 |  |  |  |
| Emkal NNS, (free acid of nonylnaphthalene sodium sulfonate) |  |  | 130 |  |  |
| Nekal NF, (free acid of sodium alkylnaphthlenesulfonate) |  |  |  | 130 |  |
| Santomerse ME, (free acid of linear dodecylbenzene sodium sulfonate) |  |  |  |  | 130 |
| Cellosolve | 50 | 50 | 50 | 50 | 50 |
| Water | 68 | 68 | 68 | 68 | 68 |
| Monoethanolamine | 27 | 27 | 27 | 27 | 27 |
| Genacryl Red CL | 38 | 38 | 38 | 38 | 38 |
| DC Antifoam FG | 3 | 3 | 3 | 3 | 3 |
| Monoethanolamine to pH | 6–7 | 6–7 | 6–7 | 6–7 | 6–7 |
| Water to | 350 | 350 | 350 | 350 | 350 |

In all cases clear, stable solutions were obtained.

EXAMPLES 19 – 22

The following examples were formulated in the manner of Example 1.

|  | 19 | 20 | 21 | 22 |
|---|---|---|---|---|
| Nacconol 98 SA linear dodecylbenzenesulfonic acid) | 130 | 130 | 130 | 130 |
| Ethanol | 50 |  |  |  |
| Isopropanol |  | 50 |  |  |
| Diethylene glycol |  |  | 50 |  |
| Butoxyethanol |  |  |  | 50 |
| Isopropanolamine | 27 | 27 | 27 | 27 |
| Water | 68 | 68 | 68 | 68 |
| Genacryl Pink 3G | 38 | 38 | 38 | 38 |
| DC Antifoam FG | 3 | 3 | 3 | 3 |
| Isopropanolamine to pH | 6–7 | 6–7 | 6–7 | 6–7 |
| Water to | 500 | 500 | 500 | 500 |

In all cases good stable solutions were obtained.

EXAMPLE 23

1. Two assistants were prepared as follows:

|  | A Parts | B Parts |
|---|---|---|
| Assistant |  |  |
| Cellosolve | 38 | 28 |
| DC Antifoam H–10 emulsion | 2 | 2 |
| Sodium hydroxide 40°Be | 13 |  |
| Water |  | 10.2 |
| Magnesium oxide |  | 2.8 |
| To this mixture was added slowly |  |  |
| *Sulframine Acid 1298 | 47 | 47 |
| Heat and stir to the formation of viscous solutions pH 6 |  |  |

*Sulframine Acid 1298 is a linear alkylarylsulfonic acid.

2. The following linear alkylarylsulfonic acid-dyestuff complexes were prepared:

|  | 1 Parts | 2 Parts |
|---|---|---|
| Assistant A | 600 |  |
| Assistant B |  | 600 |
| Cellosolve | 100 | 100 |
| Water | 50 | 50 |
| Genacryl Yellow 4G | 100 | 100 |

Spectral analysis showed the relative strengths to be:
1. — 270/100 and 2. — 270/100.
They were adjusted to equal strength as follows:

|  | 3 Parts | 4 Parts |
|---|---|---|
| (1) | 90 |  |
| (2) |  | 90 |
| Cellosolve | 10 | 10 |
| (3) Was fluid |  |  |
| (4) Was more fluid |  |  |

3.0 Parts solutions 3 and 4 were made up to 133 parts with water. 1.0 part Genacryl Yellow 4G per se was combined with 2 parts Soropon SF–78, sodium salt, and 1 part Cellosolve and made up to 133 parts with water. Orlon-75 was padded with these solutions at 120°F., dried and cured at 400°F. for 1 minute. All dyeings were excellent.

EXAMPLE 24

The following solutions were formulated:

|  | Parts | Parts |
|---|---|---|
| Assistant A (from Ex. 23) | 85 |  |
| Assistant B (from Ex. 23) |  | 80 |
| Cellosolve | 5 | 10 |
| Genacryl Pink 3G | 10 | 10 |
|  | 100 | 100 |

Polyacrylonitrile was pad-dyed by a solvent dyeing process and gave excellent dyeings. When padded on polyacrylonitrile fabric in usual manner, employing an aqueous solution, drying and curing, excellent dyeings also resulted.

EXAMPLE 25

The following solutions were formulated:

|  | parts | parts |
|---|---|---|
| Assistant A (from Ex. 23) | 85 |  |
| Assistant B (from Ex. 23) |  | 85 |
| Genacryl Red GL | 15 | 15 |
|  | 100 | 100 |

Solvent dyeings were made giving excellent dyeings. When made into aqueous padding solutions and employed to dye polyacrylonitrile fabric in usual manner employing curing at 400°F. for 1 minute, excellent dyeings were also obtained.

EXAMPLE 26

The following formulations were prepared:

|  | parts | parts | parts | parts |
|---|---|---|---|---|
| Cellosolve | 31 | 31 | 42 | 42 |
| DC Antifoam H–10 Emulsion | 2 | 2 | 2 | 2 |
| Sodium hydroxide 40°Be | 7.8 |  | 7.8 |  |
| Water | 22.2 | 28.3 | 11.2 | 17.3 |
| Magnesium oxide |  | 1.7 |  | 1.7 |
| Sulframine Acid 1298 | 28 | 28 | 28 | 28 |
| Genacryl Yellow 4G | 9 | 9 | 9 | 9 |
|  | 1000 | 100 | 100 | 100 |

The thus-formed solutions had excellent stability. Polyacrylonitrile fabric, dyed by a solvent dyeing process gave excellent dyeings. When made into aqueous pad solutions and padded onto, dried and cured in usual manner, excellent dyeings resulted.

EXAMPLE 27

The following formulations were prepared:

|  | parts | parts | parts | parts |
|---|---|---|---|---|
| Cellosolve | 38 | 38 | 38 | 38 |
| DC Antifoam H–10 emulsion | 2 | 2 | 2 | 2 |
| Sodium carbonate | 6 |  |  |  |
| Sodium bicarbonate |  | 9.5 |  |  |
| Potassium hydroxide |  |  | 6.3 |  |
| Lithium hydroxide |  |  |  | 2.7 |
| Sulframine Acid 1298 | 47 | 47 | 47 | 47 |

These formulations were stirred to the formation of solutions.

To each was then added 10 parts Cellosolve, and 10 parts Genacryl Yellow 4G.

Dyeing of polyacrylonitrile fabric by a solvent dyeing process yielded excellent dyeings.

When aqueous paddings were made in usual manner on polyacrylonitrile and cured at 400°F. for 1 minute, the dyeings were excellent.

As will readily be apparent from the above concentrated liquids are particularly suited for transportation and use in connection with the dyeing of acrylic fibers. In the receiving dye house, the concentrated liquid may be adjusted to the desired strength with water and the viscosity thereof adjusted by the addition of thickening agents and/or other additives if desired. The particular additives employed in connection with the above concentrated dye solutions will be determined by the particular use to which said solutions are put.

What is claimed is:

1. A novel dyestuff composition for the dyeing of acrylic fibers and fabrics comprising a pre-formed water-soluble complex of a cationic dye with a linear $C_{8-24}$ alkyl aryl sulfonic acid, a lower alcoholic solvent, an alkalizing agent and water, said composition having a pH of about 6 to about 7.5

2. The aqueous dyestuff composition of claim 1 wherein the linear alkyl aryl sulfonic acid surfactant is employed in a stoichiometric excess sufficient to impart water solubility to said complex.

3. The composition of claim 1 wherein the lower alcoholic solvent is selected from the group consisting of butoxyethanol, ethoxyethanol, methanol, ethanol, isopropanol and diethylene glycol.

4. The composition of claim 1 wherein the lower alcoholic solvent is present in an amount of from about 5 to about 25 parts by weight based on the weight of the total composition.

5. The composition of claim 1 wherein the alkalizing agent is present in an amount of from about 3 to about 15 parts by weight based on the weight of the total composition.

6. The composition of claim 1 wherein said alkalizing agent is selected from lower alkyl amines, lower alkanol amines, ammonium hydroxide and alkali metal hydroxides.

7. The composition of claim 6 wherein said alkalizing agent is a lower alkanol amine selected from monoethanolamine and isopropanolamine.

8. In a thermofix process for dyeing acrylic fibrous material comprising padding said fibrous material with a dyebath, drying the padded material and curing same at an elevated temperature, the improvement which comprises employing in the dyebath a composition as defined in claim 1.